United States Patent
Aichinger

(10) Patent No.: US 11,412,015 B1
(45) Date of Patent: Aug. 9, 2022

(54) CONFIGURABLE GROUP-BASED MEDIA STREAMS DURING AN ONLINE COMMUNICATION SESSION

(71) Applicant: Microsoft Technology Licensing, LLC, Redmond, WA (US)

(72) Inventor: Michal Aichinger, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/338,163

(22) Filed: Jun. 3, 2021

(51) Int. Cl.
*H04L 65/403* (2022.01)
*H04L 65/60* (2022.01)

(52) U.S. Cl.
CPC .......... *H04L 65/403* (2013.01); *H04L 65/60* (2013.01)

(58) Field of Classification Search
CPC ............... H04L 65/1069; H04L 65/403; H04L 12/1822; H04L 65/60
See application file for complete search history.

(56) References Cited

U.S. PATENT DOCUMENTS

| | | | |
|---|---|---|---|
| 8,126,129 B1 * | 2/2012 | McGuire | H04M 3/568 379/202.01 |
| 8,594,293 B2 | 11/2013 | Jeong et al. | |
| 8,681,203 B1 * | 3/2014 | Yin | H04N 7/15 348/14.08 |
| 8,754,924 B1 | 6/2014 | Shane | |
| 10,091,253 B2 | 10/2018 | Sedar et al. | |
| 10,404,943 B1 * | 9/2019 | Fieldman | H04N 7/147 |
| 2006/0164507 A1 * | 7/2006 | Eshkoli | H04L 65/403 348/14.09 |
| 2009/0216835 A1 * | 8/2009 | Jain | G06Q 10/10 709/204 |
| 2012/0017149 A1 * | 1/2012 | Lai | H04L 65/1069 715/716 |

(Continued)

OTHER PUBLICATIONS

"How to Mute all Participants when Setting up your Zoom Meeting", Retrieved From: https://web.archive.org/web/20200519165837/https:/www.unr.edu/tlt/instructional-design/instructional-technology-resources/web-conferencing/zoom/securing-sessions/mute-all-set-up, May 19, 2020, 4 Pages.

(Continued)

*Primary Examiner* — Caroline H Jahnige
(74) *Attorney, Agent, or Firm* — Schwegman Lundberg & Woessner, P.A.

(57) ABSTRACT

Disclosed are systems, methods, and non-transitory computer-readable media for configurable group-based media streams during communication session. Group-based media streams allow a meeting administrator to define how media (e.g., video data, audio data) is shared among meeting participants by assigning the meeting participants to different participant groups. In some embodiments, meeting participants may be assigned into either a presenter group or an audience group. The meeting may be configured such that both video and audio data captured at the device of a presenter is shared with both the other presenters and the audience, while audio and/or video data captured at the devices of the audience is shared with only the presenters, but not the other members of the audience. As a result, the audience members are able to communicate with the presenters during the presentation but cannot communicate with the other members of the audience.

17 Claims, 8 Drawing Sheets

(56) References Cited

U.S. PATENT DOCUMENTS

2014/0171047 A1 6/2014 Mai et al.
2020/0219216 A1 7/2020 Davis et al.

OTHER PUBLICATIONS

"Manage Attendee Audio Permissions in Teams Meetings", Retrieved From: https://web.archive.org/web/20201105161515/https:/support.microsoft.com/en-us/office/manage-attendee-audio-permissions-in-teams-meetings-f9db15e1-f46f-46da-95c6-34f9f39e671a, Nov. 5, 2020, 8 Pages.

"Webex Meeting Types", Retrieved From: https://www.utoledo.edu/it/desktop-support/main-campus-support/docs/Webex%20Meeting%20Types.pdf, Retrieved Date: Apr. 9, 2021, 14 Pages.

"Application as Filed in U.S. Appl. No. 17/178,600", filed Feb. 18, 2021, 105 Pages.

\* cited by examiner

CONFIGURABLE GROUP-BASED MEDIA STREAMS DURING AN ONLINE COMMUNICATION SESSION

TECHNICAL FIELD

An embodiment of the present subject matter relates generally to communication sessions and, more specifically, to configurable group-based media streams during a communication session.

BACKGROUND

Communication conference systems are commonly used to conduct meetings and provide presentations online and via telephones. Communication conference systems receive media (e.g., video, audio) captured at each meeting participants device and share the data with the other meeting participants. This facilitates communication amongst the meeting participants as they can see and hear each other in real-time. One problem with communication conference is that all media (e.g., audio, video) captured at a meeting participant's device is shared with the other meeting participants, which may cause disruptions or distract from the meeting. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
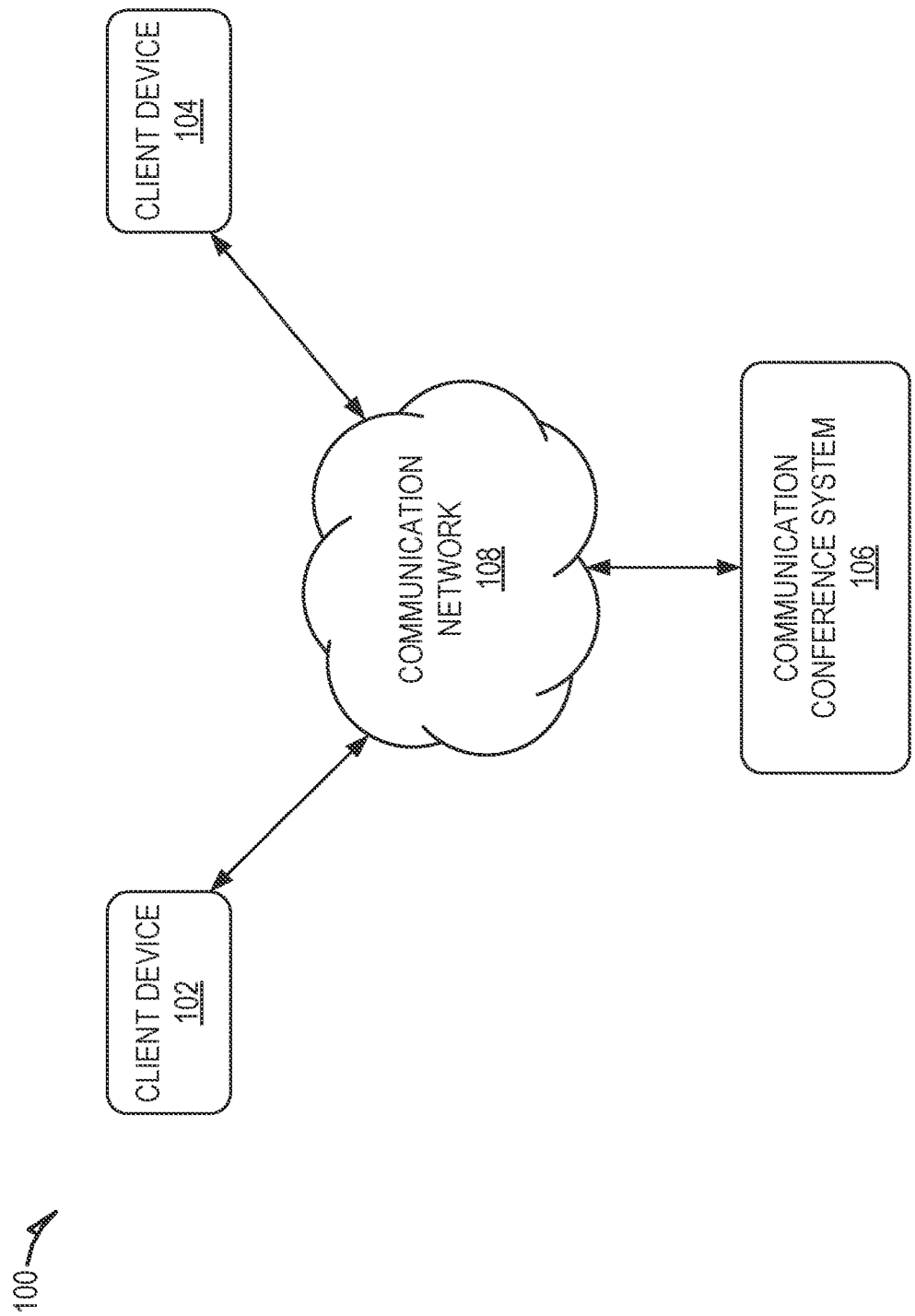
FIG. 1 shows a system for configurable group-based media streams during a communication session, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for configurable group-based media streams during a communication session. A communication conference system facilitates communication sessions (e.g., videoconferences, conference calls, etc.) between groups of meeting participants. A communication session is a conference established between meeting participants in which media (e.g., video, audio, other data) captured at each meeting participants client devices is shared with the client devices of the other meeting participants. The communication conference system allows users to schedule a communication session, and select meeting participants, as well as facilitates the transmission of media streams (e.g., video data, audio data) among the meeting participants during the communication session.

As explained earlier, current communication conference systems share media (e.g., audio, video) captured at each meeting participant's device with the other meeting participants. This may cause disruptions or distract from a meeting or presentation as some meeting participants may have side conversations or cause inadvertent sounds. To alleviate this issue, the communication conference system of the present disclosure provides for configurable group-based media streams during a communication session.

Group-based media streams allow a meeting administrator to define how media (e.g., video data, audio data) is shared among meeting participants by assigning the meeting participants to different participant groups. For example, to restrict participants from having side conversations during a presentation, meeting participants may be assigned into either a presenter group or an audience group. The meeting may be configured such that both video and audio data captured at the device of a presenter is shared with both the other presenters and the audience, while audio and/or video data captured at the devices of the audience is shared with only the presenters, but not the other members of the audience. As a result, the audience members are able to communicate with the presenters during the presentation but cannot communicate with the other members of the audience.

In some embodiments, the communication conference system provides for multiple operating modes to allow for the configuration of the group-based media streams to be adjusted during the communication session. Each operating mode may be associated with differing configurations dictating how media is shared among meeting participants in the different participant groups. For example, in one operating mode audio and/or video data captured at the devices of meeting participants assigned to an audience group is not shared with the other meeting participants assigned to the audience group, while in a second operating mode audio and/or video data captured at the devices of meeting participants assigned to the audience group is shared with the other meeting participants assigned to the audience group. This allows for different types of communication to be enabled during different portions of a communication session. For example, the first operating mode may be used to restrict side conversations during a presentation portion of a communication session, while the second operation mode may be used to allow for communication among all meeting participants during a discussion portion of the communication session.

The functionality of the communication conference system provides several improvements over existing system. As explained earlier, current systems share all media among the devices during a communication session, which may result in distractions. The communication conferencing system of present disclosure alleviates this issue by allowing for group-based media streams in which media shared among the client devices may be configured based on participant group membership. This allows for elimination of distractions during a communication session, thereby improving the overall user experience.

Group-based media streams further provides a solution to technical problems. A common technical problem faces when providing communication sessions is operating within the constraints of limited available bandwidth. For example, sharing media among a high number of meeting participants may exceed available computing bandwidth, resulting in system latency and associated performance issues, such as interrupted or delayed media, frozen media, and the like.

Utilizing group-based media streams during a communication session provides a technical solution to this technical problem by reducing the amount of media shared among the client devices in an intelligent manner. For example, the media received from each device is filtered based on the participant group membership of the meeting participants. This filtering of the media significantly reduces the amount of data shared during the communication session. The reduces strain on available bandwidth provides a technical effect of reducing latency and associated performance issues, thereby improving the perceived speed and performance of the computing devices facilitating the communication session.

FIG. 1 shows a system 100 for configurable group-based media streams during a communication session, according to some example embodiments. As shown, multiple devices (i.e., client device 102, client device 104, and communication conference system 106) are connected to a communication network 108 and configured to communicate with each other through use of the communication network 108. The communication network 108 is any type of network, including a local area network (LAN), such as an intranet, a wide area network (WAN), such as the internet, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 800 shown in FIG. 8.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with and utilize the functionality of the communication conference system 106 by using the client devices 102 and 104 that are connected to the communication network 108 by direct and/or indirect communication. Although the system 100 includes only two client devices 102, 104, this is for ease of explanation and is not meant to be limiting. One skilled in the art would appreciate that the system 100 can include any number of client devices 102, 104. Further, the communication conference system 106 may concurrently accept connections from and interact with any number of client devices 102, 104. The communication conference system 106 also supports connections from a variety of different types of client devices 102, 104, such as desktop computers; mobile computers; mobile communications devices, (e.g., mobile phones, smart phones, tablets); smart televisions; set-top boxes; and/or any other network enabled computing devices. Hence, the client devices 102 and 104 may be of varying type, capabilities, operating systems, and so forth.

A user interacts with the communication conference system 106 via a client-side application installed on the client devices 102 and 104. In some embodiments, the client-side application includes a component specific to the communication conference system 106. For example, the component may be a stand-alone application, one or more application plug-ins, and/or a browser extension. However, the users may also interact with the communication conference system 106 via a third-party application, such as a web browser, that resides on the client devices 102 and 104 and is configured to communicate with the communication conference system 106. In either case, the client-side application presents a user interface (UI) for the user to interact with the communication conference system 106. For example, the user interacts with the communication conference system 106 via a client-side application integrated with the file system or via a webpage displayed using a web browser application.

The communication conference system 106 is one or more computing devices configured to facilitate and manage communication session between various meeting participants. For example, the communication conference system 106 can facilitate a communication session between client devices 102 and 104, where a meeting participant using one client device 102 can send and receive media (e.g., audio, video, shared data) with a meeting participant using another client device 104 and vice versa.

The communication conference system 106 allows users to schedule a communication session, and select meeting participants, as well as facilitates the transmission of media stream (e.g., video data, audio data) among the meeting participants during the communication session. For example, to manage a communication session between meeting participants using two client devices 102, 104, the communication conference system 106 receives media streams, including audio data, video data, etc., from one of the client devices 102, and transmits the received media streams to the other client device 104, where it can be presented by client device 104, and vice versa. This allows the meeting participants at each client device 102, 104 to receive and share data, including audio and/or video data, thereby enabling the meeting participants to engage in a real time meeting even though the two participants may be in different geographic locations.

As explained earlier, current systems that facilitate communication sessions share audio and video data captured at each meeting participant's device with the other meeting participants. This may cause disruptions or distract from a meeting or presentation as some meeting participants may have side conversations or cause inadvertent sounds. To alleviate this issue, the communication conference system 106 of the present disclosure provides for configurable group-based media streams during a communication session.

Group-based media streams allow a meeting administrator to define how media (e.g., video data, audio data) is shared among meeting participants by assigning the meeting participants to different participant groups. For example, a meeting organizer can limit side conversations during a presentation by assigning the meeting participants into either a presenter group or an audience group. The meeting may be configured such that both video and audio data captured at the device of a presenter is shared with both the other presenters and the audience, while audio and/or video data captured at the devices of the audience is shared with only the presenters, but not the other members of the audience. As a result, the audience members are able to communicate with the presenters during the presentation but cannot communicate with the other members of the audience.

In some embodiments, the communication conference system 106 provides for multiple operating modes to allow for the configuration of the group-based media streams to be adjusted during the communication session. Each operating mode may be associated with differing configurations dictating how media is shared among meeting participants in the different participant groups. For example, in one operating mode audio and/or video data captured at the client devices 102, 104 of meeting participants assigned to an audience group is not shared with the other meeting participants assigned to the audience group, while in a second operating mode audio and/or video data captured at the client devices 102, 104 of meeting participants assigned to the audience group is shared with the other meeting participants assigned to the audience group. This allows for different types of communication to be enabled during different portions of a communication session. For example, the first operating mode may be used to restrict side conversations during a presentation portion of a communication session, while the second operation mode may be used to allow for communication among all meeting participants during a discussion portion of the communication session.

Figure 2:
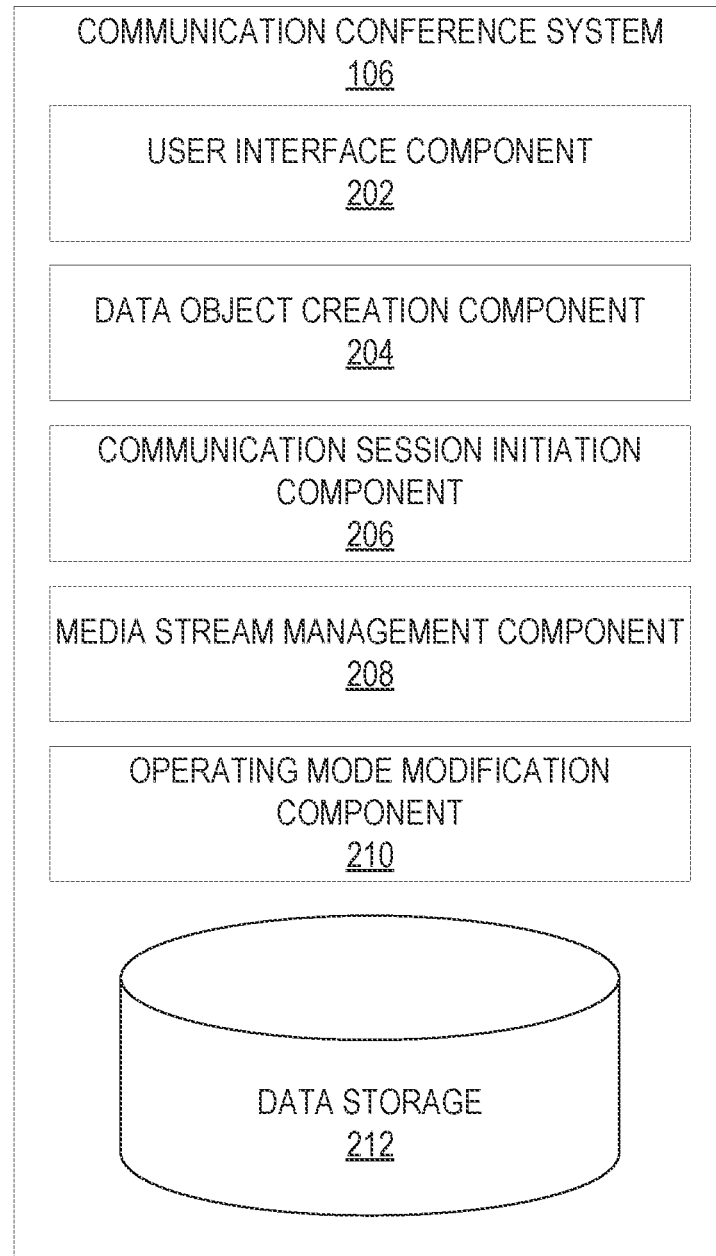
FIG. 2. is a block diagram of a communication conference system for configurable group-based media streams during a communication session, according to some example embodiments.

FIG. 2 is a block diagram of a communication conference system 106 for configurable group-based media streams during a communication session, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the communication conference system 106 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the communication conference system 106 includes a user interface component 202, a data object creation component 204, a communication session initiation component 206, a media stream management component 208, an operating mode modification component 210, and a data storage 212.

The user interface component 202 enables users to schedule and configure communication sessions that provide group-based media streams. The user interface component 202 provides a communication session scheduling interface that includes user interface elements, such as buttons, textboxes, and the like, that allow a user to schedule and configure a communication session. For example, the communication session scheduling interface may enable a user to select a day/time for a communication session, define a meeting title, select meeting participants, and the like.

The communication session scheduling interface also enables the user to define participant groups and operating modes of the communication session based on the participant groups. For example, the communication session scheduling interface enables the user to create the desired participant groups, assign a name to the participant group, as well as assign meeting participants to the created participant groups.

The communication session scheduling interface further enables the user to define one or more operating modes based on the participant groups. Each operating mode defines how media streams should be allocated to members in the various participant groups during the communication session. For example, an operating mode defines how media captured at client devices 102, 104 of meeting participants assigned to a participant group is to be shared with other meeting participants based on the participant group membership of the other meeting participants. In one example, an operating mode may dictate that audio captured by client devices 102, 104 of meeting participants assigned to a particular participant group (e.g., audience participant group) not be shared with other meeting participants assigned to the same participant group (e.g., audience participant group). The same operating mode may dictate that both video and audio captured by the client devices 102, 104 of meeting participants assigned to the particular participant group (e.g., audience participant group) be shared with other meeting participants assigned to a different participant group (e.g., presenter participant group) and vice versa.

The communication session scheduling interface enables a user to create any number of participant groups and/or operating modes. For example, a communication session may include 2, 3, 4, etc., participant groups or operating modes. Further, meeting participants may be assigned to more than one participant group.

The user interface component 202 provides data entered by a user via the communication session scheduling interface to the other components of the communication conference system 106 and/or stores the data in the data storage 212, where it may be accessing to the other components.

The user interface component 202 also enables a user to configure the communication session in real-time while the communication session is active. For example, an authorized user may use the communication session scheduling interface to establish and/or modify the participant groups and the operating modes during the communication session. This allows for the communication session to be configured prior to and/or during the communication session.

The data object creation component 204 generates a data object for a communication session based on the data provided by a user via the communication session scheduling interface. The data object included data defining the scheduled communication session and is subsequently used to facilitate the communication session. For example, the data object is used to determine how to properly allocated media among the meeting participants during the communication session.

The data object includes data describing the scheduled communication session, such as the title, the scheduled day/time of the communication session, an associate identifier for the communication session, and the like. The data object also includes data identifying the meeting participants of the video conference. For example, the data object includes a listing of unique identifiers associated with the meeting participants, such as account numbers, phone numbers, and/or any other type of unique identifier.

The data object also includes data defining the various participant groups established for the communication session. For example, the data object includes data defining the name of each participant group, the meeting participants assigned to each participant group (e.g., unique identifier associated with each participant group), and the like.

The data object also includes data defining the various operating modes established for the video conference. For example, the data object includes names assigned to each operating mode, media routing information describing how media (e.g., video, audio, data) received from client devices 102, 104 assigned to each participant group should be routed to the other meeting participants, and the like.

The data object creation component 204 stores the created data object in the data storage 212 for subsequent use by the other components of the communication conference system 106.

The communication session initiation component 206 initiates a communication session. For example, the communication session initiation component 206 receives requests to join a communication session and authenticates the received request. The communication session initiation component 206 authenticates the requests based on the data object for the communication session. To authenticate a request, the communication session initiation component 206 accesses the data object for the communication session from the data storage 212 and uses the data included in the data object to identify meeting participants that are authorized to join the communication session and/or identify a password for joining the communication session.

The communication session initiation component 206 also establishes media streams with the client devices 102, 104 used to join the communication session. A media stream is a continuous exchange of media between a client device 102, 104 and the communication conference system 106. The media may include any type of data captured at a client device 102, 104 to be shared with other client devices 102, 104 during a communication session. For example, the media may include audio data captured using a microphone, image data (e.g., video) captured using an optical sensor, and/or shared computing data, such as a shared virtual document, slideshow, or desktop.

The media streams established by the communication session initiation component 206 are used to share media between the various client devices 102, 104 for purposes of facilitating a communication session. For example, video and audio data captured at the client devices 102, 104 and provided to the communication conference system 106 via the media streams may be shared with the other client devices 102, 104. This allows the meeting participants to communicate with each other in real-time during the communication session.

As explained earlier, the communication conference system 106 provides for configurable group-based media streams during a communication session. Rather than share the media received via each media stream with each of the other meeting participants, the communication conference system 106 shares the media based on the participant groups to which the meeting participants are assigned.

The media stream management component 208 facilitates the process of managing media streams to the client device 102, 104 based on the participant groups of the meeting participants. For example, the media stream management component 208 determines how to allocate the media received from each client device 102, 104 during a communication session to the other client device 102, 104 participating in the communication session.

The media stream management component 208 uses the data object for the communication session to determine how to properly route the media among the client devices 102, 104. The media stream management component 208 accesses the data object from the data storage 212 and uses the data object to map the media streams established by the communication session initiation component 206 to their corresponding participant group membership. For example, the media stream management component 208 uses the data object to identify the participant group membership associated with each established media stream, such as by determining the participant group membership of the meeting participant associated with the client device 102, 104 to which the media stream is established. The media stream management component 208 may then allocate media to the various client devices 102, 104 using the established media streams based on the mapping and the operating mode of the communication session as defined by the data object.

In some embodiments, the media stream management component 208 allocates the media to the client devices 102, 104 by forwarding the media received from a client device 102, 104, or a portion thereof, to the other client device 102, 104. For example, the media stream management component 208 may forward a media stream of audio data received from one client device 102, 104 to another. In this type of embodiment, the media stream management component 208 allocates the media to the client devices 102, 104 by permitting or inhibiting the transmission of media among the client devices 102, 104. For example, the media stream management component 208 may permit certain types of media, such as video and audio, to be forwarded to members of one participant group, and inhibit some of the media, such as audio, from being forwarded to members of another participant group.

In this type of the embodiment, the individual media streams received from a client device 102, 104 may include a single type of media, such as video, audio, or shared data. The media stream management component 208 forwards the individual media streams based on the participant group membership of the meeting participants.

In some embodiments, however, the media stream management component 208 may allocate the media by generating an aggregated media stream based on the media received from the client device 102, 104. For example, the media stream management component 208 may generate an aggregated media stream based on combinations of the participant group from which the media was received and the participant group to which the media is destined. The aggregated media stream may be aggregated to include the types of media that is to be shared with the destination participant group based and exclude the types of media that is to be inhibited to the destination participant group.

The operating mode modification component 210 provides for modification of the operating mode of the communication session. For example, the operating mode modification component 210 allows an administrator, meeting organizer, and/or other authorized user to cause the operating mode of the communication session to be modified. In response to receiving a request to modify the operating mode of the communication session, the operating mode modification component 210 may notify the other components of the communication conference system 106 of the change in the operating mode. For example, the operating mode modification component 210 may notify the media stream management component 208 that the operating mode has been modified, causing the media stream management component 208 to begin operating according to the new operating mode. The operating mode modification component 210 may also update the data object for the communication session to reflect the change in the operating mode. For example, the operating mode modification component 210 may access the data object from the data storage 212 and update the data object to reflect the current operating mode of the communication session.

Figure 3:
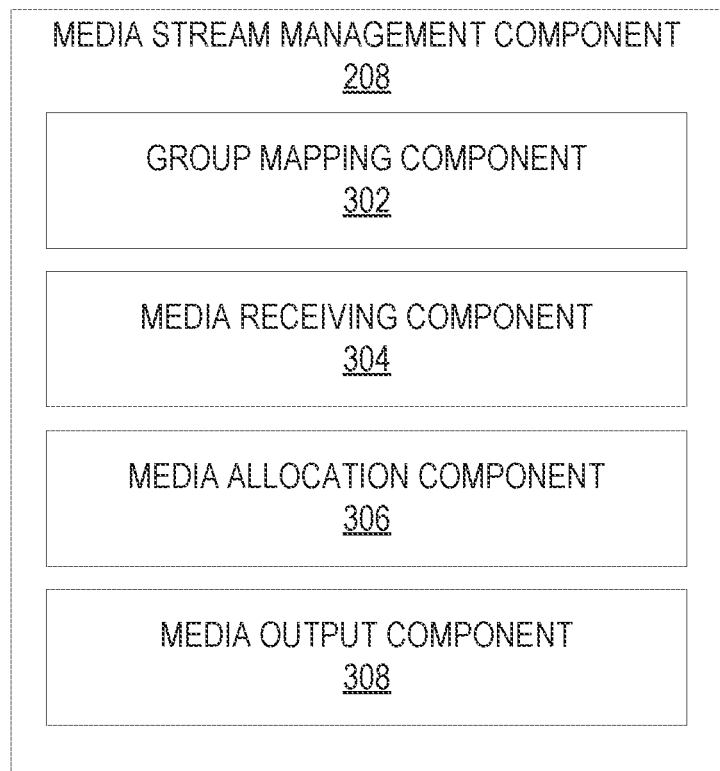
FIG. 3 is a block diagram of a media stream management component, according to some example embodiments.

FIG. 3 is a block diagram of a media stream management component 208, according to some example embodiments To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the media stream management component 208 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the media stream management component 208 includes a group mapping component 302, a media receiving component 304, a media allocation component 306, and a media output component 308.

The group mapping component 302 maps media streams initiate with client devices 102, 104 to participant groups. The group mapping component 302 maps the media streams based on the data object for the communication session. For example, the group mapping component 302 accesses the data object from the data storage 212 and uses the data object to map the media streams established by the communication session initiation component 206 to their corresponding participant group membership. For example, the group mapping component 302 uses the data object to identify the participant group membership associated with each established media stream, such as by determining the participant group membership of the meeting participant associated with the client device 102, 104 to which the media stream is established.

The media receiving component 304 receives media from the client devices 102, 104 via the established media streams. The media may include any type of data captured at a client device 102, 104 to be shared with other client devices 102, 104 during a communication session. For example, the media may include audio data captured using a microphone, image data (e.g., video) captured using an optical sensor, and/or shared computing data, such as a shared virtual document, slideshow, or desktop.

The media allocation component 306 determines how to allocate the media received from the client devices 102, 104 to the other client devices 102, 104 participating in the communication session. For example, the media allocation component 306 uses the data object for the communication session to determine how to properly allocate the media among the client devices 102, 104. The media allocation component 306 accesses the data object from the data storage 212 and the mapping of the media streams to their corresponding participant group membership to determine how to properly allocate the media.

The media output component 308 transmits the media based on the allocation determined by the media allocation component 306. In some embodiments, the media output component 308 allocates the media to the client devices 102, 104 by forwarding the media received from a client device 102, 104, or a portion thereof, to the other client device 102, 104. For example, the media output component 308 may forward a media stream of audio data received from one client device 102, 104 to another. In this type of embodiment, the media output component 308 allocates the media to the client devices 102, 104 by permitting or inhibiting the transmission of media among the client devices 102, 104. For example, the media output component 308 may permit certain types of media, such as video and audio, to be forwarded to members of one participant group, and inhibit some of the media, such as audio, from being forwarded to members of another participant group.

In this type of the embodiment, the individual media streams received from a client device 102, 104 may include a single type of media, such as video, audio, or shared data. The media output component 308 forwards the individual media streams based on the participant group membership of the meeting participants.

In some embodiments, however, the media output component 308 may allocate the media by generating an aggregated media stream based on the media received from the client device 102, 104. For example, the media output component 308 may generate an aggregated media stream based on combinations of the participant group from which the media was received and the participant group to which the media is destined. The aggregated media stream may be aggregated to include the types of media that is to be shared with the destination participant group based and exclude the types of media that is to be inhibited to the destination participant group.

Figure 4:
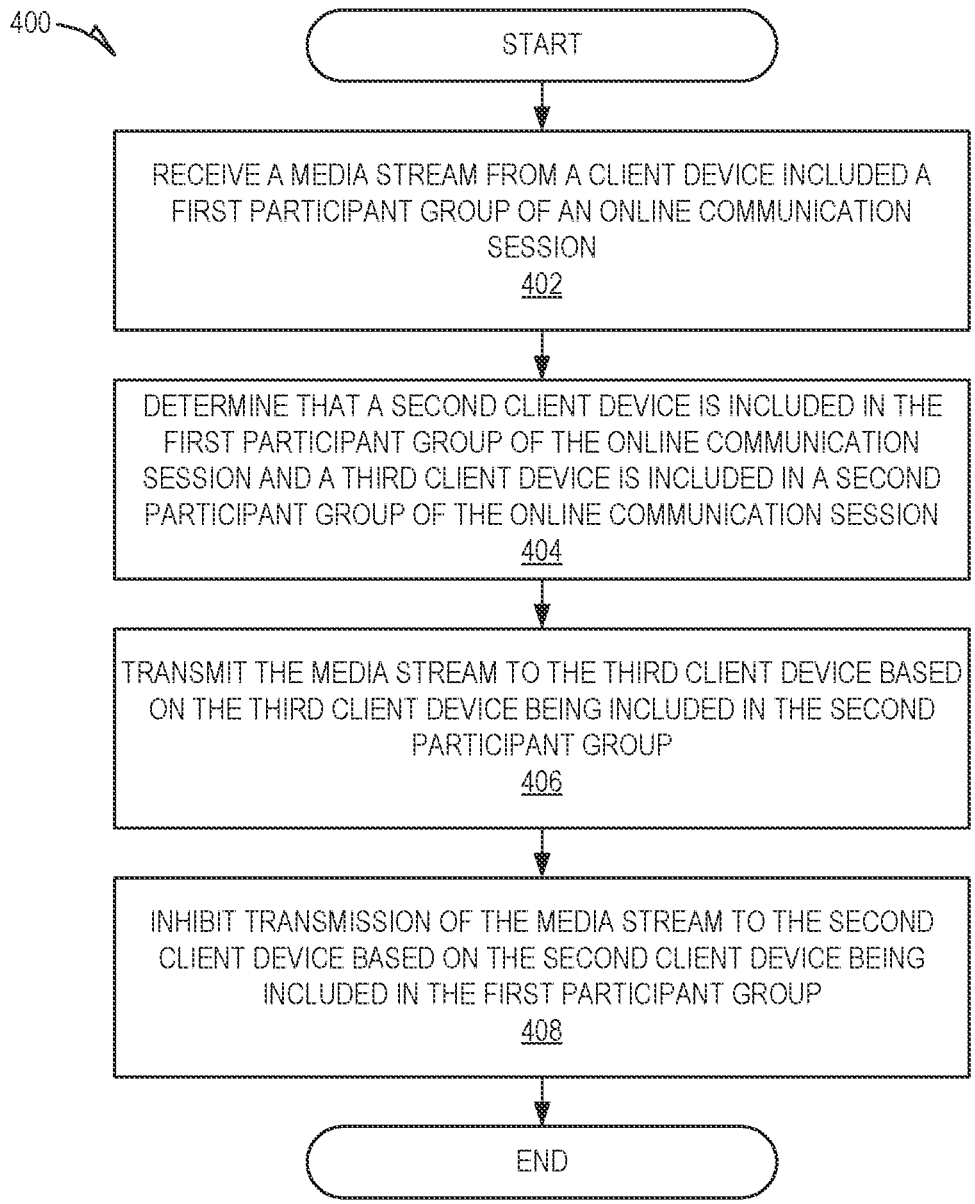
FIG. 4 is a flowchart showing a method for configurable group-based media streams during a communication session, according to certain example embodiments.

FIG. 4 is a flowchart showing a method 400 for configurable group-based media streams during a communication session, according to certain example embodiments. The method 400 may be embodied in computer readable instructions for execution by one or more processors such that the operations of the method 400 may be performed in part or in whole by the communication conference system 106;

accordingly, the method 400 is described below by way of example with reference thereto. However, it shall be appreciated that at least some of the operations of the method 400 may be deployed on various other hardware configurations and the method 400 is not intended to be limited to the communication conference system 106.

At operation 402, the media receiving component 304 receives a media stream from a client device 102, 104 included in a first participant group of an online communication session. The media receiving component 304 receives media from the client devices 102, 104 via the established media streams. The media may include any type of data captured at a client device 102, 104 to be shared with other client devices 102, 104 during a communication session. For example, the media may include audio data captured using a microphone, image data (e.g., video) captured using an optical sensor, and/or shared computing data, such as a shared virtual document, slideshow, or desktop.

At operation 404, the group mapping component 302 determines that a second client device 102, 104 is included in the first participant group of the online communication session and a third client device 102, 104 is included in a second participant group of the online communication session. The group mapping component 302 maps media streams initiating with client devices 102, 104 to participant groups. The group mapping component 302 maps the media streams based on the data object for the communication session. For example, the group mapping component 302 accesses the data object from the data storage 212 and uses the data object to map the media streams established by the communication session initiation component 206 to their corresponding participant group membership. For example, the group mapping component 302 uses the data object to identify the participant group membership associated with each established media stream, such as by determining the participant group membership of the meeting participant associated with the client device 102, 104 to which the media stream is established.

At operation 406, the media output component 308 transmits the media stream to the third client device 102, 104 based on the third client device 102, 104 being included in the second participant group. At operation 408, the media output component 308 inhibits transmission of the media stream to the second client device 102, 104 based on the second client device 102, 104 being included in the first participant group. The media allocation component 306 determines how to allocate the media received from the client devices 102, 104 to the other client devices 102, 104 participating in the communication session. For example, the media allocation component 306 uses the data object for the communication session to determine how to properly allocate the media among the client devices 102, 104. The media allocation component 306 accesses the data object from the data storage 212 and the mapping of the media streams to their corresponding participant group membership to determine how to property allocate the media.

The media output component 308 transmits the media based on the allocation determined by the media allocation component 306. In some embodiments, the media output component 308 allocates the media to the client devices 102, 104 by forwarding the media received from a client device 102, 104, or a portion thereof, to the other client device 102, 104. For example, the media output component 308 may forward a media stream of audio data received from one client device 102, 104 to another. In this type of embodiment, the media output component 308 allocates the media to the client devices 102, 104 by permitting or inhibiting the transmission of media among the client devices 102, 104. For example, the media output component 308 may permit certain types of media, such as video and audio, to be forwarded to members of one participant group, and inhibit some of the media, such as audio, from being forwarded to members of another participant group.

In this type of the embodiment, the individual media streams received from a client device 102, 104 may include a single type of media, such as video, audio, or shared data. The media output component 308 forwards the individual media streams based on the participant group membership of the meeting participants.

In some embodiments, however, the media output component 308 may allocate the media by generating an aggregated media stream based on the media received from the client device 102, 104. For example, the media output component 308 may generate an aggregated media stream based on combinations of the participant group from which the media was received and the participant group to which the media is destined. The aggregated media stream may be aggregated to include the types of media that is to be shared with the destination participant group based and exclude the types of media that is to be inhibited to the destination participant group.

Figure 5:
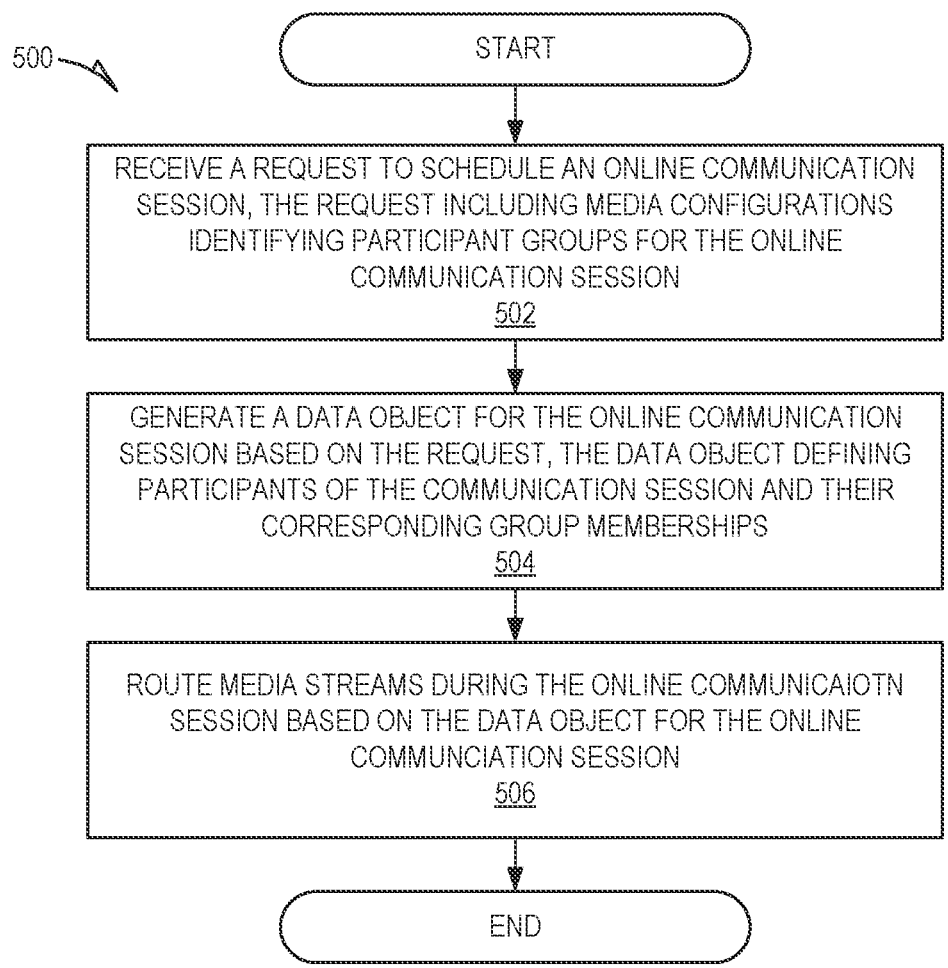
FIG. 5 is a flowchart showing a method for generating a communication session providing configurable group-based media streams, according to certain example embodiments.

FIG. 5 is a flowchart showing a method 500 for generating a communication session providing configurable group-based media streams, according to certain example embodiments. The method 500 may be embodied in computer readable instructions for execution by one or more processors such that the operations of the method 500 may be performed in part or in whole by the communication conference system 106; accordingly, the method 500 is described below by way of example with reference thereto. However, it shall be appreciated that at least some of the operations of the method 500 may be deployed on various other hardware configurations and the method 500 is not intended to be limited to the communication conference system 106.

At operation 502, the user interface component 202 receives a request to schedule an online communication session, the request including media configurations identifying participant groups for the online communication session. The user interface component 202 enables users to schedule and configure communication sessions that provide group-based media streams. The user interface component 202 provides a communication session scheduling interface that includes user interface elements, such as buttons, textboxes, and the like, that allow a user to schedule and configure a communication session. For example, the communication session scheduling interface may enable a user to select a day/time for a communication session, define a meeting title, select meeting participants, and the like.

The communication session scheduling interface also enables the user to define participant groups and operating modes of the communication session based on the participant groups. For example, the communication session scheduling interface enables the user to create the desired participant groups, assign a name to the participant group, as well as assign meeting participants to the created participant groups.

The communication session scheduling interface further enables the user to define one or more operating modes based on the participant groups. Each operating mode defines how media streams should be allocated to members in the various participant groups during the communication session. For example, an operating mode defines how media captured at client devices 102, 104 of meeting participants assigned to a participant group is to be shared with other meeting participants based on the participant group membership of the other meeting participants. In one example, an operating mode may dictate that audio captured by client devices 102, 104 of meeting participants assigned to a particular participant group (e.g., audience participant group) not be shared with other meeting participants assigned to the same participant group (e.g., audience participant group). The same operating mode may dictate that both video and audio captured by the client devices 102, 104 of meeting participants assigned to the particular participant group (e.g., audience participant group) be shared with other meeting participants assigned to a different participant group (e.g., presenter participant group) and vice versa.

The communication session scheduling interface enables a user to create any number of participant groups and/or operating modes. For example, a communication session may include 2, 3, 4, etc., participant groups or operating modes. Further, meeting participants may be assigned to more than one participant group.

The user interface component 202 provides data entered by a user via the communication session scheduling interface to the other components of the communication conference system 106 and/or stores the data in the data storage 212, where it may be accessing to the other components.

At operation 504, the data object creation component 204 generates a data object for the online communication session based on the request, the data object defining participant of the communication session and their corresponding group memberships. The data object creation component 204 generates a data object for a communication session based on the data provided by a user via the communication session scheduling interface. The data object included data defining the scheduled communication session and is subsequently used to facilitate the communication session. For example, the data object is used to determine how to properly allocated media among the meeting participants during the communication session.

The data object includes data describing the scheduled communication session, such as the title, the scheduled day/time of the communication session, an associate identifier for the communication session, and the like. The data object also includes data identifying the meeting participants of the video conference. For example, the data object includes a listing of unique identifiers associated with the meeting participants, such as account numbers, phone numbers, and/or any other type of unique identifier.

The data object also includes data defining the various participant groups established for the communication session. For example, the data object includes data defining the name of each participant group, the meeting participants assigned to each participant group (e.g., unique identifier associated with each participant group), and the like.

The data object also includes data defining the various operating modes established for the video conference. For example, the data object includes names assigned to each operating mode, media routing information describing how media (e.g., video, audio, data) received from client devices 102, 104 assigned to each participant group should be routed to the other meeting participants, and the like.

The data object creation component 204 stores the created data object in the data storage 212 for subsequent use by the other components of the communication conference system 106.

At operation 506, the media stream management component 208 routes media streams during the online communication session based on the data object for the online communication session. The media stream management component 208 facilitates the process of managing media streams to the client device 102, 104 based on the participant groups of the meeting participants. For example, the media stream management component 208 determines how to allocate the media received from each client device 102, 104 during a communication session to the other client device 102, 104 participating in the communication session.

The media stream management component 208 uses the data object for the communication session to determine how to properly route the media among the client devices 102, 104. The media stream management component 208 accesses the data object from the data storage 212 and uses the data object to map the media streams established by the communication session initiation component 206 to their corresponding participant group membership. For example, the media stream management component 208 uses the data object to identify the participant group membership associated with each established media stream, such as by determining the participant group membership of the meeting participant associated with the client device 102, 104 to which the media stream is established. The media stream management component 208 may then allocate media to the various client devices 102, 104 using the established media streams based on the mapping and the operating mode of the communication session as defined by the data object.

In some embodiments, the media stream management component 208 allocates the media to the client devices 102, 104 by forwarding the media received from a client device 102, 104, or a portion thereof, to the other client device 102, 104. For example, the media stream management component 208 may forward a media stream of audio data received from one client device 102, 104 to another. In this type of embodiment, the media stream management component 208 allocates the media to the client devices 102, 104 by permitting or inhibiting the transmission of media among the client devices 102, 104. For example, the media stream management component 208 may permit certain types of media, such as video and audio, to be forwarded to members of one participant group, and inhibit some of the media, such as audio, from being forwarded to members of another participant group.

In this type of the embodiment, the individual media streams received from a client device 102, 104 may include a single type of media, such as video, audio, or shared data. The media stream management component 208 forwards the individual media streams based on the participant group membership of the meeting participants.

In some embodiments, however, the media stream management component 208 may allocate the media by generating an aggregated media stream based on the media received from the client device 102, 104. For example, the media stream management component 208 may generate an aggregated media stream based on combinations of the participant group from which the media was received and the participant group to which the media is destined. The aggregated media stream may be aggregated to include the types of media that is to be shared with the destination participant group based and exclude the types of media that is to be inhibited to the destination participant group.

Figure 6:
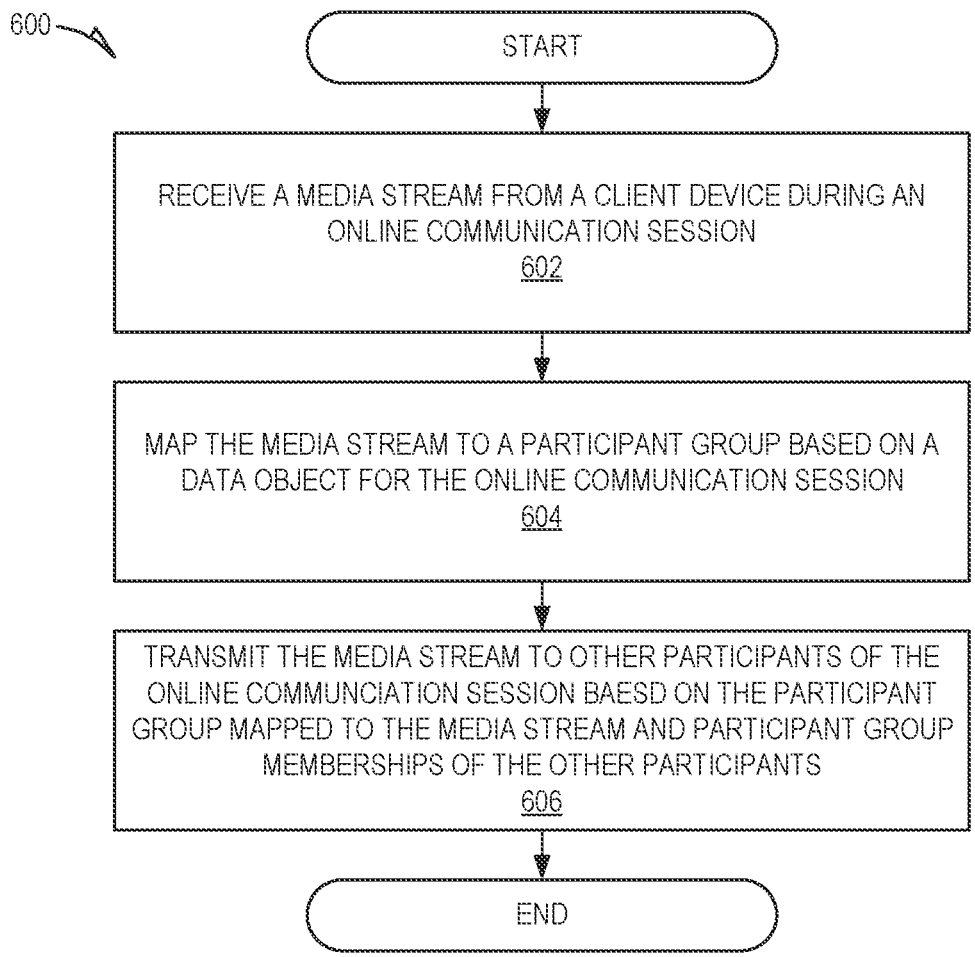
FIG. 6 is a flowchart showing a method for processing configurable group-based media streams during a communication session, according to certain example embodiments.

FIG. 6 is a flowchart showing a method 600 for processing configurable group-based media streams during a communication session, according to certain example embodiments. The method 600 may be embodied in computer readable instructions for execution by one or more processors such that the operations of the method 600 may be performed in part or in whole by the communication conference system 106; accordingly, the method 600 is described below by way of example with reference thereto. However, it shall be appreciated that at least some of the operations of the method 600 may be deployed on various other hardware configurations and the method 600 is not intended to be limited to the communication conference system 106.

At operation 602, the media receiving component 304 receives a media stream from a client device 102, 104 during an online communication session. The media receiving component 304 receives media from the client devices 102, 104 via the established media streams. The media may include any type of data captured at a client device 102, 104 to be shared with other client devices 102, 104 during a communication session. For example, the media may include audio data captured using a microphone, image data (e.g., video) captured using an optical sensor, and/or shared computing data, such as a shared virtual document, slideshow, or desktop.

At operation 604, the group mapping component 302 maps the media stream to a participant group based on a data object for the online communication session. The group mapping component 302 maps media streams initiate with client devices 102, 104 to participant groups. The group mapping component 302 maps the media streams based on the data object for the communication session. For example, the group mapping component 302 accesses the data object from the data storage 212 and uses the data object to map the media streams established by the communication session initiation component 206 to their corresponding participant group membership. For example, the group mapping component 302 uses the data object to identify the participant group membership associated with each established media stream, such as by determining the participant group membership of the meeting participant associated with the client device 102, 104 to which the media stream is established.

At operation 606, the media output component 308 transmits the media stream to other participants of the online communication session based on the participant group mapped to the media stream and participant groups memberships of the other participants. The media output component 308 transmits the media based on the allocation determined by the media allocation component 306. In some embodiments, the media output component 308 allocates the media to the client devices 102, 104 by forwarding the media received from a client device 102, 104, or a portion thereof, to the other client device 102, 104. For example, the media output component 308 may forward a media stream of audio data received from one client device 102, 104 to another. In this type of embodiment, the media output component 308 allocates the media to the client devices 102, 104 by permitting or inhibiting the transmission of media among the client devices 102, 104. For example, the media output component 308 may permit certain types of media, such as video and audio, to be forwarded to members of one participant group, and inhibit some of the media, such as audio, from being forwarded to members of another participant group.

In this type of the embodiment, the individual media streams received from a client device 102, 104 may include a single type of media, such as video, audio, or shared data. The media output component 308 forwards the individual media streams based on the participant group membership of the meeting participants.

In some embodiments, however, the media output component 308 may allocate the media by generating an aggregated media stream based on the media received from the client device 102, 104. For example, the media output component 308 may generate an aggregated media stream based on combinations of the participant group from which the media was received and the participant group to which the media is destined. The aggregated media stream may be aggregated to include the types of media that is to be shared with the destination participant group based and exclude the types of media that is to be inhibited to the destination participant group.

Software Architecture

Figure 7:
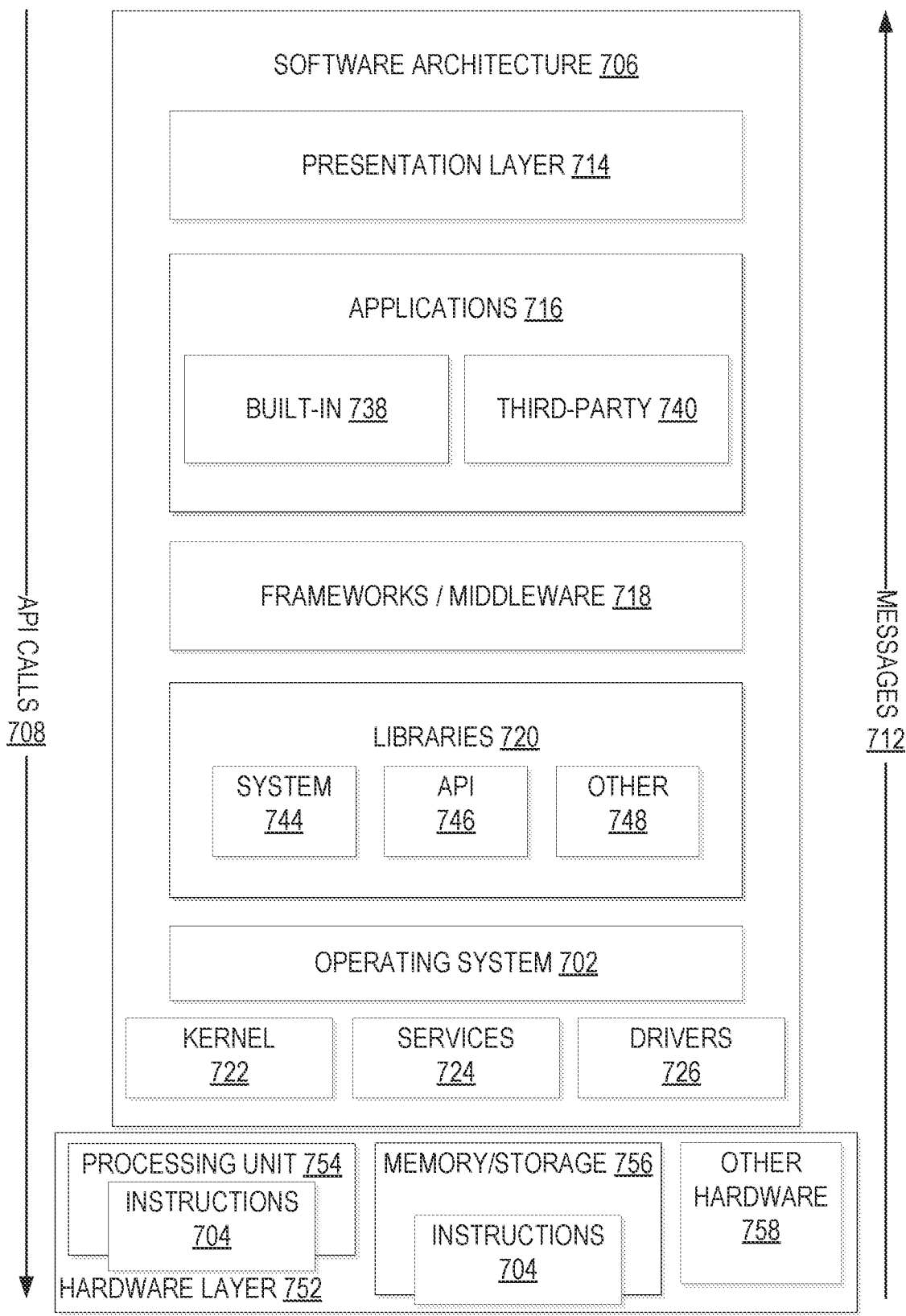
FIG. 7 is a block diagram illustrating a representative software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke application programming interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
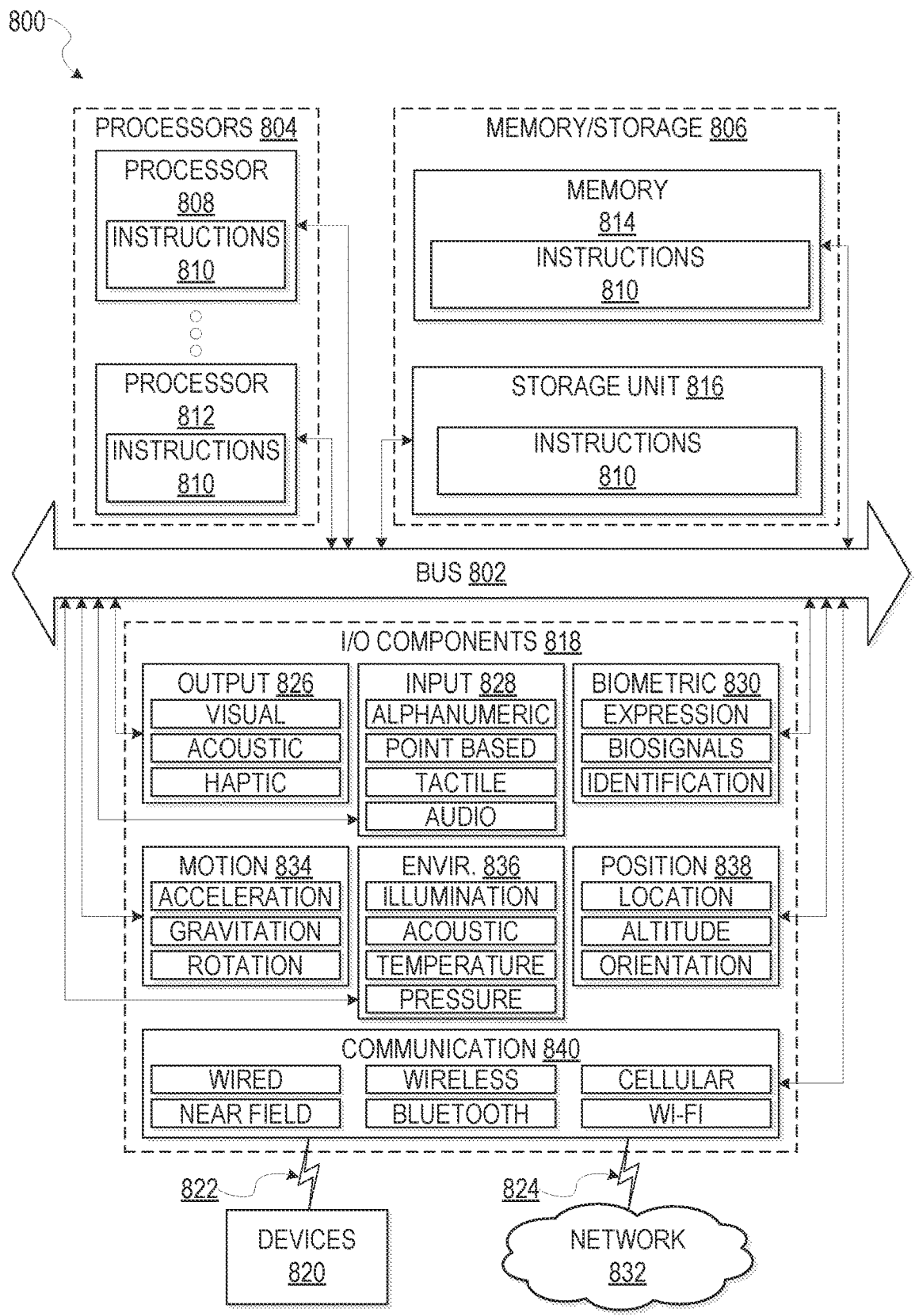
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 804 may further be a multi-core processor having two or more independent processors 804 (sometimes referred to as "cores") that may execute instructions 810 contemporaneously.

What is claimed is:

1. A method for configurable group-based media streams during an online communication session, the method comprising:
    receiving, by a communication system, media configurations for establishing the online communication session, the media configurations identifying participants in first and second participant groups, wherein the first participant group is an audience group and the second participant group is a presenter group;
    receiving, by the communication system, a first media stream from a first client device engaged in the online communication session, the first client device being included in the first participant group defined by the media configurations established for the online communication session;
    determining, based on the media configurations established for the online communication session, that a second client device engaged in the online communication session is included in the first participant group and that a third client device engaged in the online communication session is included in the second participant group;
    transmitting the first media stream to the third client device based on the third client device being included in the second participant group;
    inhibiting transmission of the first media stream to the second client device based on the second client device being included in the first participant group;
    receiving a second media stream from the third client device; and
    transmitting the second media stream to the first client device and the second client device based on the second client device being included in the second participant group.

2. The method of claim 1, further comprising:
    receiving an additional media stream from the first client device along with the first media stream, the first media stream including a first type of media and the additional media stream including a second type of media; and
    transmitting the additional media stream to the second client device and the third client device.

3. The method of claim 2, wherein the first type of media is audio and the second type of media is video.

4. The method of claim 1, further comprising:
    modifying an operating mode of the online communication session from a first mode of operation to a second mode of operation;
    after modifying the operating mode of the online communication session, receiving a subsequent media stream from the first client device; and
    transmitting the subsequent media stream to the second client device and the third client device.

5. The method of claim 1, further comprising:
    receiving a request to schedule the online communication session, the request including the media configurations for the online communication session.

6. The method of claim 5, further comprising:
    generating a data object for the online communication session based on the request, the data object including the media configurations defining participants of the online communication session and their corresponding group memberships.

7. The method of claim 1, wherein
    the method further comprises establishing, by the communication system, the participants of the audience and presenter groups according to the media configurations prior to the online communication session.

8. The method of claim 1, the method further comprising:
    receiving, by the communication system, a third media stream from the second client device engaged in the online communication session,
    transmitting the third media stream to the third client device based on the third client device being included in the second participant group; and
    inhibiting transmission of the third media stream to the second client device based on the second client device being included in the first participant group.

9. A communication system for configurable group-based media streams during an online communication session, the communication system comprising:
    one or more computer processors; and
    one or more computer-readable mediums storing instructions that, when executed by the one or more computer processors, cause the communication system to perform operations comprising:
        receiving media configurations for establishing the online communication session, the media configurations identifying participants in first and second participant groups, wherein the first participant group is an audience group and the second participant group is a presenter group;
        receiving a first media stream from a first client device engaged in the online communication session, the first client device being included in the first participant group defined by the media configurations established for the online communication session;
        determining, based on the media configurations established for the online communication session, that a second client device engaged in the online communication session is included in the first participant group and that a third client device engaged in the online communication session is included in the second participant group;
        transmitting the first media stream to the third client device based on the third client device being included in the second participant group;
        inhibiting transmission of the first media stream to the second client device based on the second client device being included in the first participant group;
        receiving a second media stream from the third client device; and
        transmitting the second media stream to the first client device and the second client device based on the second client device being included in the second participant group.

10. The communication system of claim 9, the operations further comprising:
    receiving an additional media stream from the first client device along with the first media stream, the first media stream including a first type of media and the additional media stream including a second type of media; and transmitting the additional media stream to the second client device and the third client device.

11. The communication system of claim 10, wherein the first type of media is audio and the second type of media is video.

12. The communication system of claim 9, the operations further comprising:

modifying an operating mode of the online communication session from a first mode of operation to a second mode of operation;

after modifying the operating mode of the online communication session, receiving a subsequent media stream from the first client device; and transmitting the subsequent media stream to the second client device and the third client device.

13. The communication system of claim 9, the operations further comprising:

receiving a request to schedule the online communication session, the request including the media configurations for the online communication session.

14. The communication system of claim 13, the operations further comprising:

generating a data object for the online communication session based on the request, the data object including the media configurations defining participants of the online communication session and their corresponding group memberships.

15. A non-transitory computer-readable medium storing instructions that, when executed by one or more computer processors of a communication system, cause the communication system to perform operations for configurable group-based media streams during an online communication session, the operations comprising:

receiving media configurations for establishing the online communication session, the media configurations identifying participants in first and second participant groups, wherein the first participant group is an audience group and the second participant group is a presenter group;

receiving a first media stream from a first client device engaged in the online communication session, the first client device being included in the first participant group defined by the media configurations established for the online communication session;

determining, based on the media configurations established for the online communication session, that a second client device engaged in the online communication session is included in the first participant group and that a third client device engaged in the online communication session is included in the second participant group;

transmitting the first media stream to the third client device based on the third client device being included in the second participant group;

inhibiting transmission of the first media stream to the second client device based on the second client device being included in the first participant group;

receiving a second media stream from the third client device; and transmitting the second media stream to the first client device and the second client device based on the second client device being included in the second participant group.

16. The non-transitory computer-readable medium of claim 15, the operations further comprising:

transmitting the second media stream to a fourth client device that is included in the second participant group.

17. The non-transitory computer-readable medium of claim 15, the operations further comprising:

receiving an additional media stream from the first client device along with the first media stream, the first media stream including a first type of media and the additional media stream including a second type of media; and transmitting the additional media stream to the second client device and the third client device.

* * * * *